A. H. & J. H. RACE.
Apparatus for Preventing Back-Motion.

No. 143,252. Patented September 30, 1873.

Witnesses:
A. Bennerkendorf
C. Sedgwick

Inventor:
A. H. Race
J. H. Race
per
——— Attorneys.

UNITED STATES PATENT OFFICE.

ALFRED H. RACE AND JAMES H. RACE, OF BROOKLYN, NEW YORK.

IMPROVEMENT IN APPARATUS FOR PREVENTING BACK MOTION.

Specification forming part of Letters Patent No. 143,252, dated September 30, 1873; application filed December 9, 1872.

*To all whom it may concern:*

Be it known that we, ALFRED H. RACE and JAMES H. RACE, of Brooklyn, in the county of Kings and State of New York, have invented a new and Improved Apparatus to Prevent Back Motion, of which the following is a specification:

Our invention consists of a disk made fast to the shaft to be driven, with one or more arms pivoted in it, and projecting from the face of it to the inner periphery of a hollow disk or wheel fixed loosely on the hubs of the disk, or on the said shaft, the said arms projecting rearward of the radial lines of their pivots—that is, in the direction opposite to the one in which the wheel is to be turned—and butting against the aforesaid rim of the hollow wheel, so as to bind with great power by reason of being thus arranged, and slightly longer than the radial line from the pivot to the periphery of the wheel when the wheel is turned in the forward direction, so that the outer ends catch by friction, or from other causes, on the wheel; but they instantly release the wheel when it is turned backward, or in the direction in which the said arms incline from the raidial line, so that the wheel will turn independently of them in this direction. Between the sockets for the pivots of the arms and the periphery of the disk in which the said arms are pivoted, they work in notches in the said disk, which are so contrived that the arms are not allowed to swing so far as to fail to gripe the periphery of the wheel instantly whenever it starts forward. The power of the gripe of the arms on the periphery of the wheel is in proportion to the length of the arms, and the arrangement is calculated to afford arms of the length of the distance from the shaft to the wheel-rim, so that any required length may be obtained by having the wheel large enough.

The construction is such that no springs or screws are used in connection with the arms for fastening or actuating them, and they are so confined in the disk by the wheel-sides as to afford the most simple construction and arrangement.

Figure 1:
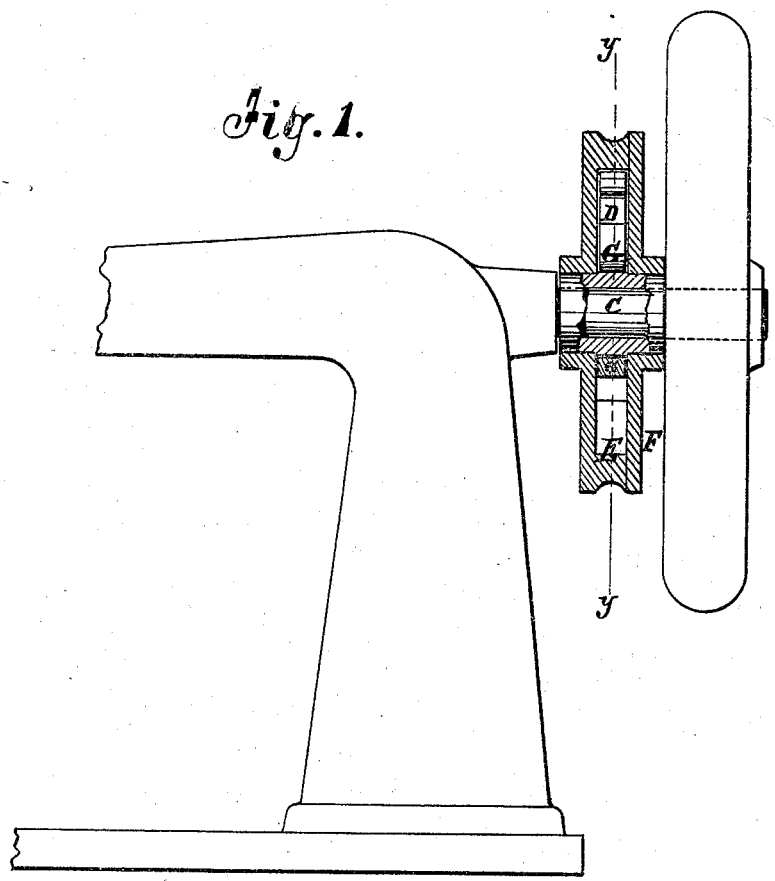
Figure 2:
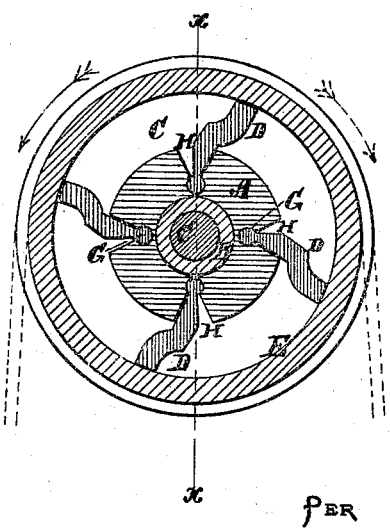

Figure 1 is a sectional elevation of a pulley contrived according to our invention, the section being taken on the line *x x* of Fig. 2; and Fig. 2 is a section taken on the line *y y* of Fig. 1.

Similar letters of reference indicate corresponding parts.

A represents the disk for holding the arms. B is the sleeve or hub by which it is fitted to the shaft C to be driven. D represents the arms. E represents the rim of the hollow pulley, against which the arms act. F is a detachable side of said pulley, to allow of arranging the disk and the arms within it. The pulley is, by preference, fitted on the hub B of the disk, so that in applying the device to any machine now in use the only fitting required is the fitting of the hub to the shaft; but, if it be preferred, the disk may be made without a hub, and the pulley fitted to the shaft. This is not, however, the best way, because the disk would have to be keyed to the shaft, which would prevent the fitting of the pivots of the arms so near to the center of the disk on account of the great liability of breaking the disk by the key when not re-enforced by the hub; and when the hub is used the disk may be fastened by a set-screw. The arms have a pivot, G, at the inner end, formed so as to be parallel with the axis of the disk; the disk has small holes for these pivots, parallel with its hole for the shaft, and as near to said hole as practicable, and it has a notch, H, extending from each pivot-hole to the periphery, out of which the arms project to the rim of the pulley. The notches widen in the outward direction to allow the arms to swing to some extent on their pivots, as they require to do in taking hold of the rim E and letting it go.

It will be seen that the arms incline to the radial lines in which their pivots are arranged considerably in the direction opposite to that in which the pulley is to turn, so as to bind on the rim E by their outer ends moving outward against it by swinging backward or toward the said radial lines, in which direction they are slightly moved by the pulley-rim when it is set in motion, the said ends either being in contact with it sufficiently to be moved by friction, or those on one side of the vertical plane of the axis falling against it— mainly the latter; and in order that there may always be one or more arms on the right side of the pulley for this purpose, we prefer three or more arms; but we may use one arm with a spring to throw it forward.

The turning of the pulley in the other direction will be unobstructed by the arms, because, in that direction, they move away from the rim E, and of course do not bind against it; but it will be observed the notches are so formed that the arms are only permitted to swing in this direction just sufficient to free them from the rim E, so they can be brought into contact with it by the slightest possible movement to avoid loss of time in starting, and make the action as nearly positive as possible.

I know that a somewhat similar mechanism has been employed, but necessitating the use of a spring to hold the pawl or pawls against the rim when free; but in light-running mechanism, like a sewing-machine, for instance, such a slight friction, and especially if multiplied into several pawls, would reverse the motion.

The contrivance is designed mainly for use on sewing-machines to prevent turning them the wrong way, and to allow of running the belt backward for turning bobbin-winding gear without running the sewing machinery.

Having thus described our invention, we claim as new and desire to secure by Letters Patent—

1. The combination of the loose pulley provided with an internal flange, E, at its periphery, the disk A, fastened rigidly to the shaft C, and the loose pressure-pawls D D D, &c., hinged thereto, all substantially as and for the purposes set forth.

2. In combination with the disk A, provided with the sockets H, constructed as described, three or more pawls, D, which are prevented from falling too far from the rim E by the sides of the notches H, and come into action, when the machinery is driven forward, entirely by their own gravity.

ALFRED H. RACE.
JAMES H. RACE.

Witnesses:
T. B. MOSHER,
A. P. THAYER.